United States Patent Office 3,000,761
Patented Sept. 19, 1961

3,000,761
METHOD OF STAINING BOROSILICATE GLASS AND RESULTANT ARTICLE
Ormonde S. Levi, Toledo, Ohio, assignor to Verd-A-Ray Processing Company, Toledo, Ohio, a corporation of Ohio
No Drawing. Filed Nov. 4, 1957, Ser. No. 694,066
6 Claims. (Cl. 117—124)

This invention relates to glass staining, and, more particularly, to a method for the staining of borosilicate glasses which are substantially completely free of arsenic.

A simplified flow diagram of the process is as follows:

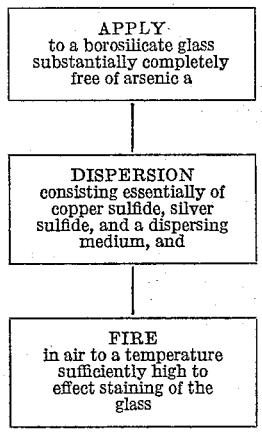

Various borosilicate glasses are disclosed in U.S. Patent 1,304,623. These glasses are all characterized by high stability, low coefficient of thermal expansion, resistance to attack by reagents, and resistance to thermal shock. Although arsenic is not listed as a part of the composition of this glass, it was widely used as a fining agent prior to about 1936, and was a trace ingredient in commercially available borosilicate glasses of the type identified in the said patent. It has been found that arsenic, usually in the form of the pentoxide, is an important glass ingredient when staining is to be carried out. For example, such a glass containing as little as 0.044 percent of arsenic pentoxide can be stained readily by any of many known staining techniques, and such a glass containing as little as 0.015 percent of arsenic pentoxide can be stained satisfactorily by some techniques.

The terms "percent" and "parts" are used herein, and in the appended claims, to refer to percent and parts by weight, unless otherwise indicated.

It has been found, however, that the complete elimination of arsenic from borosilicate glasses is desirable when these glasses are to be used for laboratory chemical ware. The presence of even minute amounts of arsenic in such glass is undesirable, because the arsenic, under certain conditions, will enter into reactions which it is desired to carry out in the ware. When it is attempted to stain a borosilicate glass which is substantially completely free of arsenic, it is found that simple staining techniques using available staining compositions are unsatisfactory. For example, the compositions and methods suggested in U.S. Patents 418,234; 1,217,490; 1,328,833; 2,002,900 and 2,330,193 either fail to effect staining at all, or produce stains which are too light for commercial utility when employed with borosilicate glasses which are substantially completely free of arsenic. The difficulty which has been encountered in coloring arsenic-free borosilicate glasses is indicated by the issuance of U.S. Patent 2,075,446, which patent relates to the coloring of glass by treatment with a molten metal salt, and then annealing the glass, in some cases under reducing conditions, and states that articles made of glass $B_2$ identified in the said Patent 1,304,623 will acquire desirable coloration when dipped for about four or five minutes in a molten salt at 650° C., followed by annealing or annealing and reducing, depending upon the coloration desired.

Borosilicate glasses which are substantially completely free of arsenic can safely be heated to about 565° C. before heat distortion becomes a serious problem. If graduates or other precision articles of glassware made from such glass are subjected to temperatures appreciably higher than 565° C., however, special precautions must be taken to prevent a change in volume which would normally be incident to heat distortion thereof. This fact makes apparent the drastic nature of the coloring method disclosed in the said U.S. Patent 2,075,446, which method involves a treatment at 650° C. for from four to five minutes.

The present invention is based upon the discovery of a specific combination of staining ingredients, which combination can be used to stain borosilicate glasses which are substantially completely free of arsenic, and is effective when firing temperatures as low as 565° C. are employed. Even precision glassware, for example graduates, can be stained with this composition, without the need for any special precaution to prevent thermal distortion.

It is, therefore, an object of the invention to provide an improved method for staining a borosilicate glass which is substantially completely free of arsenic.

It is a further object of the invention to provide a method for staining a borosilicate glass which is substantially completely free of arsenic, and where copper sulfide and silver sulfide are the active staining ingredients.

Other objects and advantages will be apparent from the description which follows, which is intended only to illustrate and disclose, and is in no way to be construed as a limitation on, the invention.

According to the invention, an improved method for staining a borosilicate glass which is substantially completely free of arsenic is provided. Such method comprises applying to the glass a dispersion which consists essentially of copper sulfide, silver sulfide and a dispersing medium. The copper sulfide must constitute at least 10 percent of the dispersion, and the silver sulfide must constitute at least 5 percent of the dispersion, such percentages being based upon the total weight of copper sulfide and silver sulfide. After application of the dispersion, the glass and applied dispersion are fired to a temperature sufficiently high to effect staining of the glass, but insufficient to cause distortion thereof.

Optimum results have been achieved in staining arsenic-free borosilicate glasses in accordance with the invention when the applied dispersion has contained from 60 percent to 90 percent of copper sulfide and from 10 percent to 40 percent of silver sulfide, based upon the total weight of copper sulfide and silver sulfide. The results are optimum from the standpoint of depth of color achieved, and light transmission characteristics of the stained glass.

The specific identity of the dispersing medium utilized in producing a stain according to the invention is not critical. For example, the dispersing medium can be water, or can be an organic liquid. The copper sulfide and the silver sulfide, which are the active staining ingredients in the dispersion, should be finely divided, usually finer than about 100 mesh. In addition, the amount of copper sulfide and silver sulfide in the dispersion should be sufficient that an appreciable deposit of the active staining ingredients remains upon a glass surface after evaporation or distillation of the dispersing medium. The quantity of copper sulfide and silver sulfide which must be applied to the glass surface is so minute that an extremely delicate balance is required to weigh it. However, it has been found that satisfactory staining results ever, it has been found that satisfactory staining results can be achieved when the total amount of copper sulfide and silver sulfide constitutes at least 5 percent of the dispersion. Preferably, for optimum results, the copper sulfide and silver sulfide should constitute at least about 10 percent of the dispersion. Water is usually preferred as the dispersing medium when a desired result can be achieved therewith. For example, if an entire surface of an arsenic-free borosilicate glass is to be stained, an aqueous dispersion of copper sulfide and silver sulfide can be applied to such surface, and the use thereof is preferred for economic reasons. However, when special results or effects are desired, the use of an organic dispersing medium, usually a screening oil, may be preferred. For example, if only a portion of a surface is to be stained, copper sulfide and silver sulfide, in appropriate proportions, can be dispersed in a screening oil and applied, by spraying, brushing, or dipping, using a suitable mask, which is usually a silk screen, to prevent application of the dispersion to portions of the surface where staining is not desired. In such cases, the use of an organic dispersing medium, and specifically a screening oil, is preferred.

It has been found that the dispersion which is applied to an arsenic-free borosilicate glass must consist essentially of the copper sulfide, the silver sulfide, and the dispersing medium. The use of such a dispersion is contrary to conventional staining practices. In most staining operations, ochre or some similar clay material is advantageously employed as a part of the dispersion. It has been found that, in most instances, ochre or other similar material not only facilitates the application of the staining dispersion by thickening thereof and physically adhering to the glass surface to be stained, but, also, that a stain which is deeper in color is achieved when ochre or the like is used. The opposite has been found to be true, however, in staining arsenic-free borosilicate glass in accordance with the invention. The addition of ochre to a staining dispersion reduces the intensity of the color achieved, the reduction in intensity being of such magnitude that an unacceptably light stain is produced when an amount of ochre considerably less than that usually employed in staining operations is added to a dispersion for staining in accordance with the invention. For example, a satisfactory stain can be produced from a dispersion of 9.4 parts of copper sulfide, 10.6 parts of silver sulfide, and 25.0 parts of water, by applying such dispersion to an arsenic-free borosilicate glass and heating the so coated glass to 1050° F., or 565° C., for 15 minutes. If, however, ochre to the extent of 31.8 parts is added to the dispersion, only unsatisfactorily light stains can be produced therefrom. It has also been found that adding copper hydroxide to such a staining dispersion makes the production of the satisfactorily dark stains impossible, and that the addition of silver nitrate has a similar effect. When silver nitrate is added to an aqueous staining dispersion, an effect other than that which ochre and copper hydrate have is also a factor. Silver sulfide has a lower solubility product constant than copper sulfide, so that an addition of silver nitrate will convert an equivalent amount of copper sulfide to copper nitrate, the silver nitrate being converted to silver sulfide. In some instances, the effect of adding silver nitrate to a staining dispersion is not apparent until such time as there is insufficient copper sulfide present to effect satisfactory staining. In other instances, however, the addition of a lesser amount of silver nitrate prevents achievement of a satisfactorily dark stain. It will be appreciated, therefore, that, while limited amounts of ingredients other than the copper sulfide, the silver sulfide, and the dispersing medium can be tolerated in a staining composition used in accordance with the invention, such composition must consist essentially of the three indicated ingredients.

Light transmittance data constitute the most reliable basis for evaluating the darkness of a stain. Stains produced according to the invention are satisfactory from the color standpoint when they transmit less than 5 percent of any light having a wave length from 400 to 460 millimicrons. Optimum color is indicated by transmission of not more than 5 percent of the light of any wave length from 400 to 500 millimicrons.

The following example is presented solely for the purpose of further illustrating and disclosing the invention, and is no way to be construed as a limitation thereon.

EXAMPLE

A 1 quart porcelain jar mill loaded with 1 pound of porcelain balls having an average diameter of about ½ inch was charged with 8 grams of silver sulfide, 12 grams of copper sulfide, and 25 cc. of water. The mill was then closed, and rotated at approximately 60 revolutions per minute for 12 hours. The contents of the mill, comprising finely ground copper sulfide, finely ground silver sulfide, and water were placed in an evaporating dish; the mill was washed with a 50 cc. portion of water, and the washings were added to the evaporating dish. The liquid in the dish was then evaporated by gentle heating on an electric plate. A 10 gram portion of the remaining dried mixture of copper sulfide and silver sulfide was stirred into 13 cc. of water to produce a dispersion, and the resulting dispersion was applied to three different borosilicate glass tubes. In one case the dispersion was poured over the glass tube; in a second case the dispersion was sprayed onto the glass tube; and in the third case the dispersion was brushed onto the glass tube. A second dispersion was also produced from 10 grams of the dry mixture of copper sulfide and silver sulfide and a 10 cc. portion of a screening oil which is commercially available under the trade designation 515 Harshaw. A coating of the screening oil dispersion was applied to each of three tubes of glass by spraying, brushing and flowing techniques. In all cases, the glass tubes had the following analysis:

| | Percent |
|---|---|
| Silicon dioxide ($SiO_2$) | 80.36 |
| Iron oxide ($Fe_2O_3$) | 0.029 |
| Aluminum oxide ($Al_2O_3$) | 2.56 |
| Zinc oxide (ZnO)—non found. | |
| Calcium oxide (CaO) | 0.11 |
| Barium oxide (BaO)—none found. | |
| Magnesium oxide (MgO) | 0.03 |
| Sodium oxide ($Na_2O$) | 3.89 |
| Potassium oxide ($K_2O$)—trace. | |
| Boric oxide ($B_2O_3$) | 13.16 |
| Arsenic pentoxide ($As_2O_5$)—none found. | |
| Antimony pentoxide ($Sb_2O_5$)—none found. | |
| Lithium oxide ($Li_2O$)—none found. | |
| | 100.139 |

Each of the coated tubes was then heated to a temperature of 1050° F. for 15 minutes, cooled, and washed with a dilute hydrochloric acid solution containing about 5 percent of HCl to remove material which remained on the surface thereof. Each of the tubes was found to have been stained a deep amber. The light transmittance charatceristics between 400 millimicrons and 500 millimicrons for each of the tubes were found to be essentially the same, and as indicated below:

| Wave length in millimicrons | 1 percent light transmission |
|---|---|
| 400 | 0 |
| 425 | 0 |
| 450 | 0 |
| 475 | 0 |
| 500 | 2 |
| 525 | 11 |

The same procedure was also used to stain additional samples of the same glass, except that various other staining dispersions were used. Details of the jar mill charge, the production of a dispersion from a mixture of copper sulfide and silver sulfide withdrawn from the mill, and details of the firing procedure are presented in Table I, below:

Table I

| Sample No. | Jar Mill Charge | | | Staining Dispersion | | Firing | |
|---|---|---|---|---|---|---|---|
| | Grams CuS | Grams Ag$_2$S | H$_2$O | Grams of milled and dried CuS-Ag$_2$S mixture | cc. of water | Temperature, °F. | Time, Minutes |
| 1 | 36 | 4 | 40 | 20 | 20 | 1,050 | 15 |
| 2 | 32 | 8 | 40 | 20 | 20 | 1,050 | 15 |
| 3 | 28 | 12 | 40 | 20 | 20 | 1,050 | 15 |
| 4 | 24 | 16 | 40 | 20 | 20 | 1,050 | 15 |
| 5 | 20 | 20 | 40 | 24 | 20 | 1,050 | 15 |
| 6 | 16 | 24 | 40 | 25 | 20 | 1,050 | 15 |
| 7 | 12 | 28 | 40 | 27 | 20 | 1,050 | 15 |
| 8 | 8 | 32 | 40 | 30 | 20 | 1,050 | 15 |

Light transmittance data concerning the various stains are presented in Table II, below:

Table II

| Sample No. | Percent of Light Transmission | | | | | | | |
|---|---|---|---|---|---|---|---|---|
| | [1] 400 | [1] 425 | [1] 450 | [1] 475 | [1] 500 | [1] 525 | [1] 550 | [1] 575 |
| 1 | 2 | 2 | 3 | 7 | 19 | 34 | 49 | 60 |
| 2 | 0 | 0 | 0 | 0 | 1 | 5 | 14 | 26 |
| 3 | 0 | 0 | 0 | 0 | 1 | 6.5 | 18 | 32 |
| 4 | 0 | 0 | 0 | 0 | 1.5 | 9 | 23 | 37.5 |
| 5 | 0 | 0 | 0 | 0 | 2 | 10 | 23 | 37 |
| 6 | 0 | 0 | 0 | 0 | 5.5 | 19 | 33 | 48 |
| 7 | 0 | 0 | 0 | 1 | 6.5 | 22 | 38 | 53 |
| 8 | 0 | 0 | 0 | 2 | 11 | 28 | 44 | 58 |

[1] Wave length in millimicrons.

It will be apparent that any available silver compound, usually silver nitrate, any available copper compound, such as copper hydroxide, copper chloride, copper sulfate and other salts having a solubility product constant less than that of copper sulfide, can be reacted, for example in the jar mill, with hydrogen-, sodium- or ammonium-sulfide to produce the corresponding sulfides. Because both copper sulfide and silver sulfide are extremely insoluble, having solubility product constants less than $9 \times 10^{-45}$, nearly any salt of either copper or silver can be so charged, and will be converted to the sulfide if a sufficient amount of hydrogen sulfide, ammonium sulfide or sodium sulfide is also used. Since silver sulfide is less soluble than either cupric sulfide or cuprous sulfide, silver sulfide is formed to the exclusion of copper sulfide so long as the amount of available sulfur is less than that required for complete reaction with the silver. Because of the undesired effect which an excess of copper hydroxide or other material has, it is usually preferred to charge the desired proportions of copper and silver, and an amount of hydrogen sulfide, ammonium sulfide or sodium sulfide sufficient for complete reaction with both the copper and the silver.

It is also preferred that any material present in the staining dispersion other than copper sulfide and silver sulfide be one which is volatile under the conditions which are employed to produce a stain with that dispersion. For this reason, where salts other than the sulfides are charged, and are converted to the sulfides, it is preferred to use hydrogen sulfide or ammonium sulfide for such conversion. Similarly, it is preferred that the anions of a copper salt or silver salt be ones which form a compound which is volatilized during firing. For example, chlorides, hydroxides, nitrates, or the like anions, form hydrochloric acid, ammonium chloride, water, nitric acid or ammonium nitrate, all of which are volatile.

It will be appreciated from the foregoing experimental data that comparatively low firing temperatures are suitable for the production of stains in accordance with the invention. In all cases, temperatures below the distortion temperature of the glass are preferred. In some cases satisfactorily dark stains can be produced at firing temperatures as low as 1000° F., or even down to about 950° F., but optimum results have been achieved when firing has been to a temperature within the range of 1000° F. to 1050° F., and using firing times of from about 10 minutes to about 20 minutes.

It will be apparent that various changes and modifications can be made from the specific details disclosed herein and shown in the example without departing from the spirit and scope of the attached claims.

What I claim is:

1. A method for staining a borosilicate glass which is substantially completely free of arsenic, which method comprises applying to such glass a dispersion which consists essentially of copper sulfide, silver sulfide and a dispersing medium, the copper sulfide constituting at least 10 percent of the dispersion, and the silver sulfide constituting at least 5 percent of the dispersion, based upon the total weight of copper sulfide and silver sulfide, and firing the glass and applied dispersion in air to a temperature sufficiently high to effect staining of the glass.

2. A method for staining a borosilicate glass which is substantially completely free of arsenic, which method comprises applying to such glass a dispersion which consists essentially of copper sulfide, silver sulfide and a dispersing medium, the copper sulfide constituting from 60 percent to 90 percent of the dispersion, and the silver sulfide constituting from 10 percent to 40 percent of the dispersion, based upon the total weight of copper sulfide and silver sulfide, and firing the glass and applied dispersion in air to a temperature sufficiently high to effect staining of the glass.

3. A method for staining a borosilicate glass which is substantially completely free of arsenic, which method comprises applying to such glass a dispersion which consists essentially of copper sulfide, silver sulfide and an aqueous dispersing medium, the copper sulfide constituting from 60 percent to 90 percent of the dispersion, and the silver sulfide constituting from 10 percent to 40 percent of the dispersion, based upon the total weight of copper sulfide and silver sulfide, and firing the glass and applied dispersion in air to a temperature sufficiently high to effect staining of the glass.

4. A method for staining a borosilicate glass which is substantially completely free of arsenic, which method comprises applying to such glass a dispersion which consists essentially of copper sulfide, silver sulfide and an organic dispersing medium, the copper sulfide constituting from 60 percent to 90 percent of the dispersion, and the silver sulfide constituting from 10 percent to 40 percent of the dispersion, based upon the total weight of copper sulfide and silver sulfide, and firing the glass and applied dispersion in air to a temperature sufficiently high to effect staining of the glass.

5. A method for staining a borosilicate glass which is substantially completely free of arsenic, which method comprises applying to such glass a dispersion which consists essentially of copper sulfide, silver sulfide and a screening oil as an organic dispersing medium, the copper sulfide constituting from 60 percent to 90 percent of the dispersion, and the silver sulfide constituting from 10 percent to 40 percent of the dispersion, based upon the total weight of copper sulfide and silver sulfide, and firing the glass and applied dispersion in air to a temperature sufficiently high to effect staining of the glass.

6. A stained glass produced by the method claimed in claim 1.

References Cited in the file of this patent

UNITED STATES PATENTS

| 2,075,446 | Leibid | Mar. 30, 1937 |
| 2,662,037 | Levi | Dec. 8, 1953 |
| 2,701,215 | Kroeck | Feb. 1, 1955 |
| 2,930,106 | Wrotnowski | Mar. 29, 1960 |

UNITED STATES PATENT OFFICE
CERTIFICATE OF CORRECTION

Patent No. 3,000,761                          September 19, 1961

Ormonde S. Levi

It is hereby certified that error appears in the above numbered patent requiring correction and that the said Letters Patent should read as corrected below.

Column 3, line 1, strike out "ever, it has been found that satisfactory staining results".

Signed and sealed this 6th day of March 1962.

(SEAL)
Attest:

ERNEST W. SWIDER                          DAVID L. LADD
Attesting Officer                            Commissioner of Patents